United States Patent [19]
Eaton et al.

[11] Patent Number: 5,883,886
[45] Date of Patent: Mar. 16, 1999

[54] UTILITY METER READINGS ON A REVERSE CHANNEL OF A TWO-WAY PAGING SYSTEM

[75] Inventors: Eric Thomas Eaton, Lake Worth; Von Alan Mock, Boynton Beach; Philip P. Macnak, Palm Beach, all of Fla.

[73] Assignee: Motorola, Inc., Schaumburg, Ill.

[21] Appl. No.: 778,799

[22] Filed: Jan. 3, 1997

[51] Int. Cl.$^6$ ..................................................... H04J 3/14
[52] U.S. Cl. ........................................ 370/314; 455/31.3
[58] Field of Search .................................... 370/313, 314; 379/106.03, 106.04, 106.05, 106.06, 106.07, 106.08; 455/405, 406, 407, 408, 31.2, 31.3, 426, 432, 433, 440, 458, 515, 524; 340/825.44

[56] References Cited

U.S. PATENT DOCUMENTS

| | | |
|---|---|---|
| 4,651,156 | 3/1987 | Martinez . |
| 4,875,038 | 10/1989 | Siwiak et al. . |
| 4,914,651 | 4/1990 | Lusignan .................................. 370/329 |
| 4,928,096 | 5/1990 | Leonardo et al. . |
| 5,124,697 | 6/1992 | Moore . |
| 5,153,582 | 10/1992 | Davis . |
| 5,168,493 | 12/1992 | Nelson et al. . |
| 5,390,339 | 2/1995 | Bruckert et al. . |
| 5,475,863 | 12/1995 | Simpson et al. . |
| 5,521,926 | 5/1996 | Ayerst et al. . |
| 5,526,401 | 6/1996 | Roach, Jr. et al. ...................... 455/426 |
| 5,542,115 | 7/1996 | Wong et al. ......................... 340/825.44 |
| 5,555,183 | 9/1996 | Willard et al. . |
| 5,633,872 | 5/1997 | Dinkins .................................... 370/312 |

OTHER PUBLICATIONS

Motorola, Inc., "Introduction To The Wireless Concert!", 1995.
Motorola, Inc., "The Wireless Concert! Overview and Network Design", 1996.
Motorola, Inc., "The Wireless Message Gateway Product Specification", 1996.
Motorola, Inc., "Motorola HC11 Reference Manual", 1991.
Motorola, Inc., "Motorola MC68HC11PH8 Technical Data", 1995.
Motorola, Inc., "Motorola Product Family 255 Service Manual", 1995.
Motorola, Inc., "Motorola Product Family 255 Series Controller Supplement", 1995.

Primary Examiner—Huy D. Vu

[57] ABSTRACT

A meter reading device (22) for wirelessly transmitting meter readings from a plurality of meters (30) includes a receiver (44) for receiving a synchronization signal (60), a clock (40) connected to the receiver, a wireless transmitter (46) connected to the receiver for transmitting meter readings in synchronization with the synchronization signal, and a microcomputer (32) pre-programmable to receive meter readings from the meter and to actuate the wireless transmitter at a different specific time for each of the meters. The transmitter transmits a radio frequency signal carrying only meter readings on a reverse channel of a two-way paging system (10) during a particular reverse channel time-slot (90) of a synchronous two-way paging protocol. A messaging terminal (18) of a the two-way paging system transfers signals carrying meter readings, along with time-slot identification, to a meter reading correlator (24) which correlates the signals with each of the meters based upon the time-slot identification alone.

5 Claims, 4 Drawing Sheets

UTILITY METER READINGS ON A REVERSE CHANNEL OF A TWO-WAY PAGING SYSTEM

FIELD OF THE INVENTION

This invention relates in general to wireless communication systems and more specifically to obtaining utility meter readings via a two-way radio paging system using a synchronous paging protocol.

BACKGROUND OF THE INVENTION

Known apparatus, systems and methods to remotely read utility meters fall generally into two major categories. The prior art of the first category uses wirelines to send signals containing meter readings to a central location. The prior art of the second category uses radio frequency electromagnetic waves to wirelessly send signals containing meter readings to a central location. Known apparatus, systems and methods of the second category can be sub-classified into several groups. One group of systems disadvantageously requires a receiver at each utility meter for receiving a signal that prompts a transmitter at the utility meter to transmit another signal containing a reading of the meter. Systems of this group also disadvantageously require a transmitter at the central location or at a mobile vehicle. A second group of systems, have transmitters at each utility meter that make numerous asynchronous pseudo-random transmissions in the expectation that one of the transmissions will be received by the central location. Transmissions made in systems of this second group require identification information to be transmitted with the meter reading information so that the transmitted meter reading information can be matched with a particular utility meter. The requirement of transmitting identification information disadvantageously lengthens the duration of each transmission. Furthermore, making a plurality of transmissions to convey one meter reading unnecessarily increases radio frequency congestion.

Thus, what is needed are a method and apparatus for wirelessly transmitting readings of utility meters without using a receiver at the utility meter for receiving prompts, while keeping the duration of transmissions from the utility meter to a minimum length. Also needed are a method and apparatus for correlating a plurality of transmissions, received from a plurality of utility meters at a remote receiving site, with each of the plurality of utility meters.

DETAILED DESCRIPTION OF A PREFERRED EMBODIMENT

Figure 1:
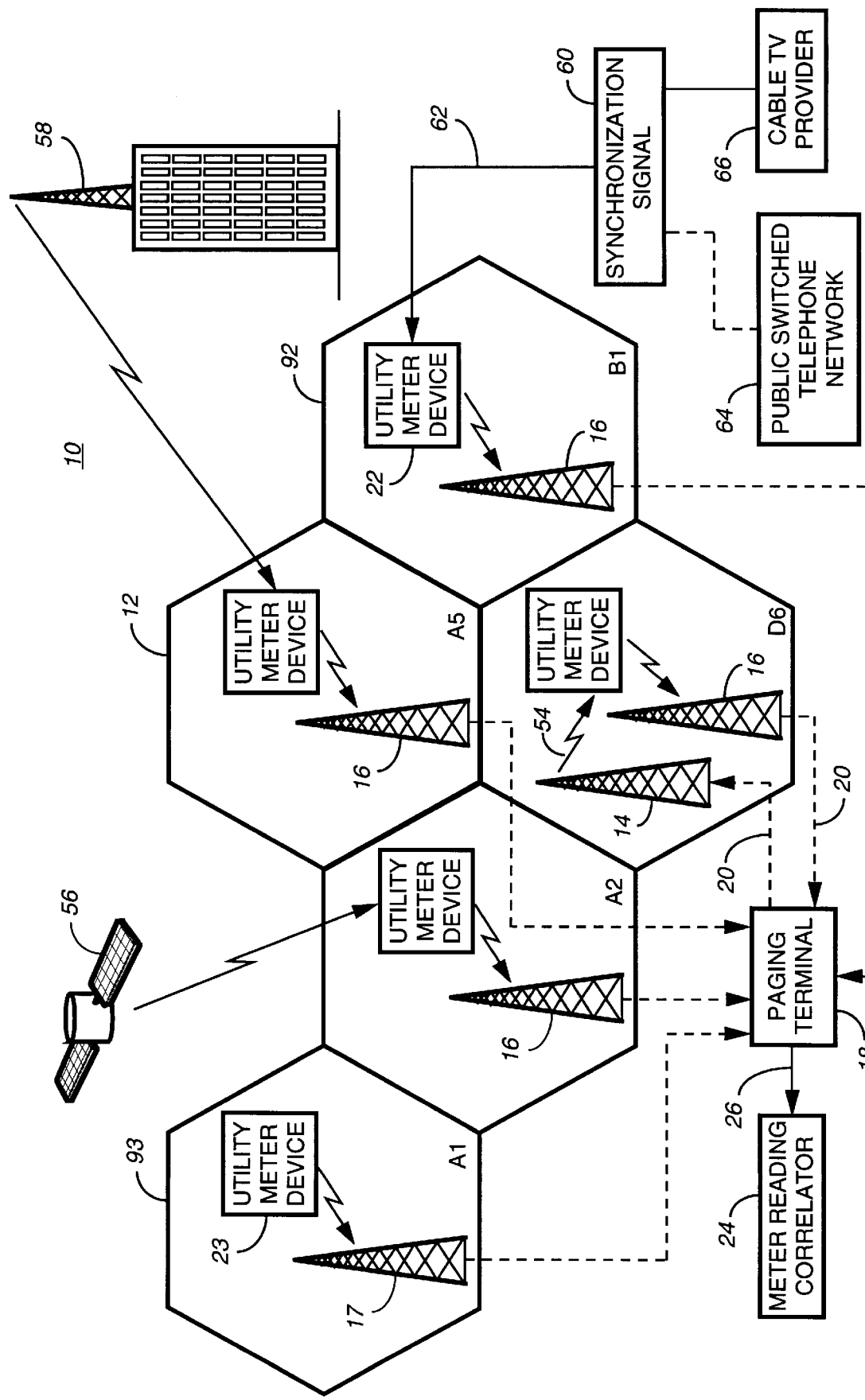
FIG. 1 is a simplified pictorial representation and block diagram of a communication system in accordance with the preferred embodiment of the present invention.

Referring to FIG. 1, a radio communication system, preferably a two-way wireless selective call synchronous communication system, or system, 10 is shown in accordance with the preferred embodiment of the present invention. The system 10 is divided into a plurality of transmission cells 12, such as is well known to those skilled in the art. Each transmission cell has a radio frequency transmitter 14 (although for simplicity of illustration, only one cell is shown with a transmitter) and one or more radio frequency receivers 16. The cell transmitters and cell receivers are coupled to a messaging terminal 18 by communication links 20. Conventional two-way selective call transceivers, or two-way pagers, although not shown, operate within one or more of the transmission cells using the system 10. Within at least some of the cells are one or more utility meter devices 22. The messaging terminal 18 oversees the operation of the cell transmitters and the cell receivers and encodes and decodes inbound and outbound messages into formats that are compatible with wireline message switches. The messaging terminal 18 includes a controller that functions to encode and decode paging messages to and from pagers and from the utility meter devices 22. The controller is responsible for scheduling the forward and reverse channel messaging in the system 10. The controller also receives the reverse channel messaging data through its connections to the receivers 16. The receivers receive the over-the-air reverse channel transmissions from the utility meter devices 22 and send the received data to the controller for processing.

The messaging terminal 18 is coupled to a meter reading correlator 24 that receives meter readings from the messaging terminal, preferably via wireline 26. The correlator 24 is coupled to a meter reading accumulator (not shown), preferably a standard general purpose computer programmed to collect and store meter readings of each utility meter for later use, such as for billing purposes.

The system 10 is a conventional two-way paging communication system modified to perform additional operations in accordance with the invention. The hardware of the controller preferably includes a Wireless Messaging Gateway (WMG™) Administrator!™ paging terminal, a RF-Conductor!™ message distributor, and a RF-Usher!™ multiplexer, manufactured by Motorola, Inc. The controller has software elements and preferably runs under a UNIX operating system. The hardware of the system preferably includes a Nucleus® Orchestra!™ transmitter and a RF-Audience!™ receiver, manufactured by Motorola, Inc. A more detailed description of the hardware of the controller, the transmitters, and the receivers are described in "*Introduction to the Wireless Concert!™*", "*The Wireless Concert!™ Overview and Network Design*" and in "*The Wireless Message Gateway™ Product Specification*", published by Motorola, Inc., which is available for sale to the public as Part No. 6880491G01, Part No. 6880491G04 and Part No. 6880491G07, respectively, from Motorola Paging Products Group, Fort Worth, Tex., and which are hereby incorporated by reference herein.

Figure 2:
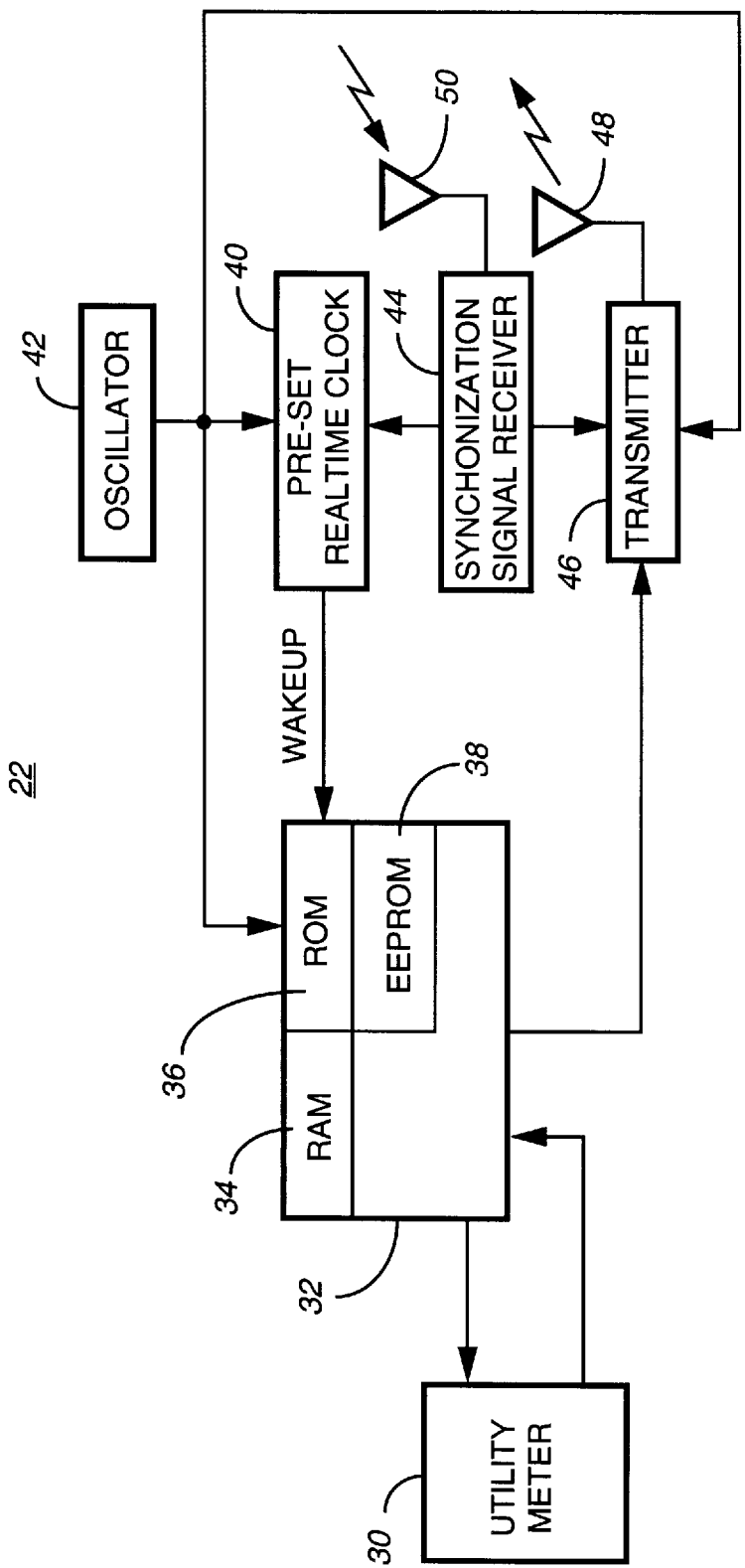
FIG. 2 is an electrical block diagram of the utility meter device shown in the communication system of FIG. 1.

Referring now to FIG. 2, the utility meter device 22 includes a utility meter 30, such as a gas, water or electric meter, having a digital output port, connected to an input port of a microcomputer 32, in a manner well known to those skilled in the art, in order to provide meter readings to the microcomputer. The microcomputer includes a random access memory, or RAM, 34, utilized to store variables derived during processing, a read-only memory, or ROM, 36, utilized to store the subroutines that control the operation of the utility meter device, and an electrically erasable programmable ROM, or EEPROM, 38. Preferably, the utility meter output port appears as an address of the RAM of the microcomputer 32. The utility meter device 22 includes a pre-set real time clock 40 connected to the microcomputer, and an oscillator 42 for providing a timing signal to the pre-set real time clock and for other circuits of the utility meter device. A crystal, or crystal controlled oscillator, (not shown) is coupled to the inputs of the oscillator 42 to provide a reference signal for establishing the microcomputer timing. The microcomputer 32 is preferably a Motorola M68HC11PH8, that performs the instructions and controls the operations of the utility meter device 22. A person skilled in the art of programming programs the microcomputer 32 to execute the functions of the utility meter device using a *Motorola HC11 Reference Manual*, published 1991 by Motorola, Inc., and using a *Motorola MC68HC11PH8 Technical Data*, published 1995 by Motorola, Inc., Part No. M68HC11RM/AD and Part No. MC68HC11PH8/D, respectively, which are available for sale to the public from Motorola Literature Distribution, Phoenix, Ariz. A synchronization signal receiver 44, connected to the pre-set real time clock, receives a synchronization signal 60 (see FIG. 3) to enable the utility meter device 22 to operate within the synchronous communication system 10. The synchronization signal receiver 44 is preferably a wireless receiver and includes a receiving antenna 50. Referring to FIG. 1, the synchronization signal receiver obtains the synchronization signal from a forward channel transmitter 54 of the system 10, from a global positioning satellite 56, or from a terrestrial broadcast station 58. The synchronization signal receiver 44 preferably obtains the synchronization signal from a forward channel of a synchronous one-way paging communication system using a protocol such as the Motorola FLEX™ system described in U.S. Pat. No. 5,168,493 issued Dec. 1, 1992 to Nelson et al., entitled Time Division Multiplexed Selective Call System, and in U.S. Pat. No. 5,555,183 issued Sep. 10, 1996 to Willard et al., entitled Method and Apparatus for Synchronizing to a Synchronous Selective Call Signal, both assigned to the assignee of the present invention, and which are hereby fully incorporated by reference herein. Alternatively, the synchronization signal receiver 44 of the utility meter device 22 receives the synchronization signal 60 via wireline 62 from a public switched telephone network provider 64 or from a cable television provider 66.

Referring again to FIG. 2, a transmitter 46, connected to the oscillator, to the synchronization signal receiver, and to the microcomputer, wirelessly transmits meter readings when actuated by the microcomputer. The transmitter 46, preferably a pager reverse channel transmitter, includes an antenna 48 coupled to an output of the transmitter. The operation of a pager reverse channel transmitter is well known in the art and is described more fully in U.S. Pat. No. 5,124,697 issued Jun. 23, 1992 to Moore, entitled Acknowledge Back Pager; U.S. Pat. No. 5,153,582 issued Oct. 6, 1992 to Davis, entitled Method and Apparatus for Acknowledging and Answering a Paging Signal; and U.S. Pat. No. 4,875,038 issued Oct. 17, 1989 to Siwiak et al., entitled Frequency Division Multiplexed Acknowledge Back Paging System, which are assigned to the assignee of the present invention and which are hereby fully incorporated by reference herein. The pager reverse channel transmitter is preferably a Motorola Tango™ pager transmitter and has a microprocessor modified to perform the operations described and shown in this specification. The Motorola Tango pager transmitter is compatible with the ReFLEX™ protocol. The Tango pager is described more fully in the *Motorola Product Family 255 Service Manual* published 1995 by Motorola, Inc., and in the *Motorola Product Family 255 Series Controller Supplement*, published 1995 by Motorola, Inc., which are available for sale to the public from Motorola Paging Products Group, Boynton Beach, Fla. as part No. 6881024B80 and part No. 68881104B36, respectively, and which are hereby fully incorporated by reference herein.

Figure 3:
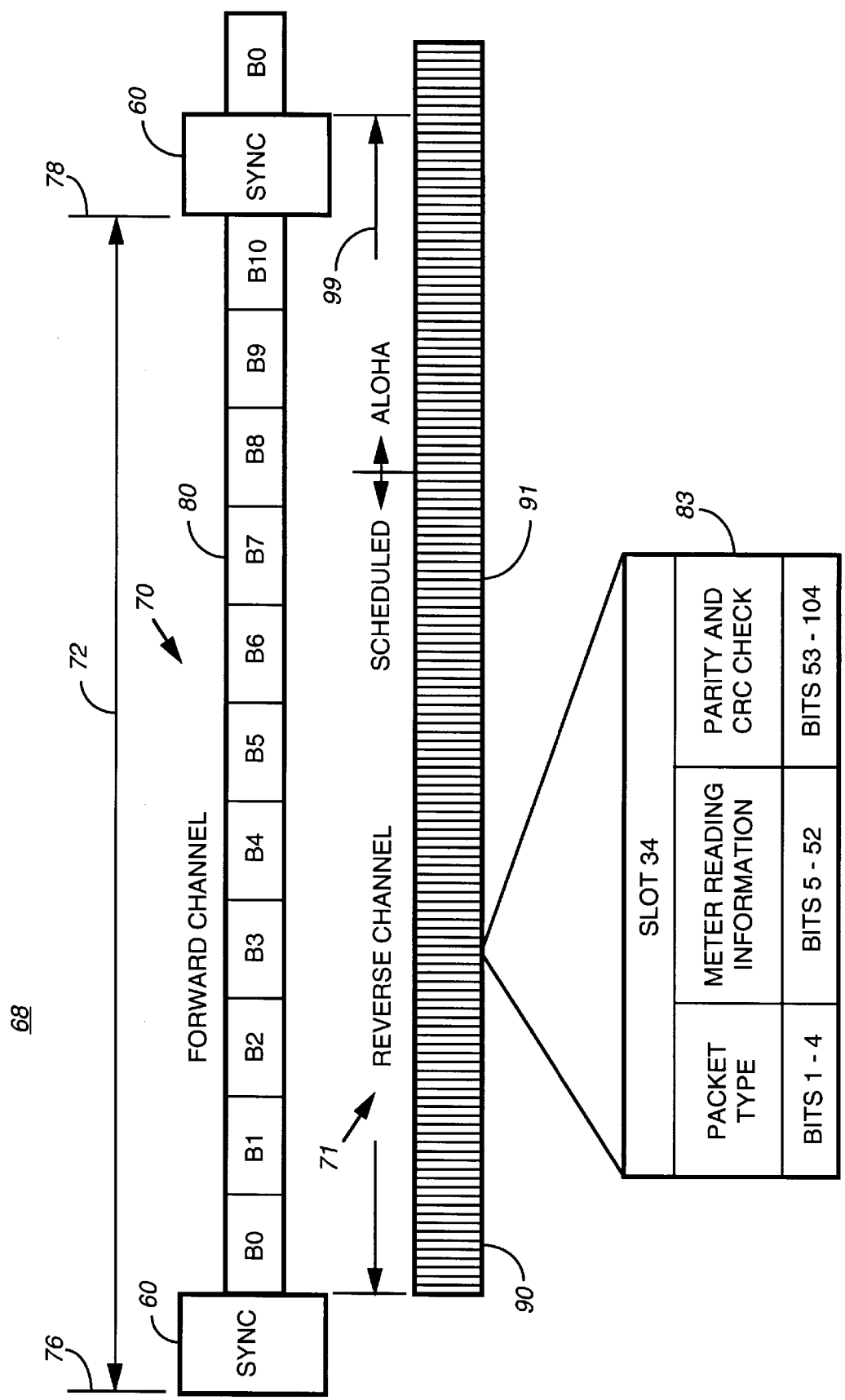
FIG. 3 is a timing diagram showing forward and reverse channel radio signals for the communication system of FIG. 1.

Referring to FIG. 3, a timing diagram 68 shows forward channel 70 and reverse channel 71 radio signals for the system 10. The forward channel radio signals, which are transmitted during a forward channel frame 72, are at first radio carrier frequency. The reverse channel radio signals, which are transmitted during a reverse channel frame, are at a second radio carrier frequency.

The forward channel frame duration is from a forward channel frame boundary 76 to a next forward channel frame boundary 78 during which transmissions of a forward channel radio signal are made from the transmitter 14 to one or more selective call transceivers, or pagers operating within system 10. The forward channel frame boundaries are preferably transmitted at regular intervals of 1.875 seconds and referenced to a first frame boundary of a first transmission cycle occurring accurately at the beginning of each hour, wherein the beginning of each hour is established using a standard time base such as a Universal Time Constant (UTC). The forward channel radio signal comprises one or more sequential radio signals transmitted from the transmitter 14. A forward channel frame synchronization and information portion, or SYNC, 60 and a plurality of outbound forward messages and are transmitted within the forward channel radio signal by the transmitter. The plurality of outbound messages are each made up of a plurality of data words 80 of equal duration that are transmitted using an outbound data rate and associated modulation scheme typically predetermined for the forward channel. The forward data rate is typically 1600, 3200, or 6400 bits per second (bps), and the modulation scheme is two or four level FM. A reverse channel frame duration is from a reverse channel frame boundary to a next reverse channel frame boundary and includes a plurality of predetermined reverse channel time-slots 90 of equal duration that are transmitted using a rate of 800 to 9600 bps and an associated modulation scheme. Messages from the utility meter devices comprise a plurality of data symbols occupying one reverse channel time-slot.

Each frame synchronization and information portion, or SYNC, 60 contains a frame synchronization pattern that marks the forward channel frame boundaries and, establishes data symbol (data rate) synchronization, and includes information describing the reverse channel offset to the reverse channel frame boundary, as a number of reverse channel time-slots.

Synchronization of the reverse channel frame 99 and reverse channel time-slot 90 required by the utility meter devices 22 in the system 10 for transmitting on the reverse channel is determined from the forward channel frame synchronization and information portion, or SYNC, 60.

The time synchronous protocol used for forward and reverse channel messaging in the system 10 specifies that the data be formatted in frames, each 1.875 seconds in duration. One cycle of frames is composed of 128 frames and has a 4 minute transmission time. There are 15 cycles of frames transmitted on the forward channel each hour.

A more detailed description of the components of the system 10 and their operation, and a detailed description of the ReFLEX two-way paging protocal functionality, are found in the following U.S. patents, all of which are assigened to the assignee of the present invention; Pat. No.

4,875,038 issued Oct. 17, 1989 to Siwiak et. al. entitled Frequency Division Multiplexed Acknowledge Back Paging System, U.S. Pat. No. 4,928,096 issued May 22,1990 to Leonardo et., entitled Paging Terminal Apparatus with Message Storage and Retransmission Capability and Method Therefore, U.S. Pat. No. 5,168, 493 issued Dec. 1, 1992 to Nelson et al., entitled Time Division Multiplexed Selective Call system, U.S. Pat. No. 5,390,339 issued Feb. 14, 1995 to Bruckert et al., entitled Method and Apparatus for Selecting a Serving Transceiver, U.S. Pat. No. 5,475,863 issued Dec. 12, 1995 to Simpson et al., entitled Method and Apparatus for Identifying a Trasmitter in a Radio Communication System; U.S. Pat. No. 5,521,926 issued May 28, 1996 to Ayerst et al., entitled Method and Apparatus for Improved Message Reception at a Fixed System Receiver; U.S. Pat. No. 5, 649,302, issued Jul. 15, 1997 to Ayerst et al., entitled Method and Apparatus for Identifying an Inbound Message in a Radio Cummunication System; U.S. Pat. No. 5,712,624 issued Jan. 27, 1998 to Ayerst, et al., entitled Method and Apparatus for Optiminizing Receiver Synchronization in a Radio Cummunication System; U.S. Pat. No. 5,644,568 issued Jul. 1, 1998 to Ayerst et al., entitled Method and Apparatus for Organizing and Recovering Information Communicated in a Radio Communication System, U.S. Pat. No. 5,638,369 issued Jun. 10, 1998 to Ayerst et al., entitled Method and Apparatus for Inbound Channel Selection in a Communication System, U.S. Pat. No. 5,737,691 issued Apr. 7, 1998 to Wang et al., entitled A System and Method for Allocation Frequency Channels in a Two-way Messaging Network, U.S. Pat. No. 5,689,805 issued Nov. 18, 1997 to Ayerst et al., entitled Communication System Providing Minimum Message Transmission Delay; and U.S. Pat. No. 5,691,709 issued Nov. 25, 1997 to Guntin, entitled Communication Transceiver Providing Unscheduled Acknowledge Back Responses and Method Therefor, which are hereby fully incorporated by reference herein. It should be appreciated that other synchronous communication protocols are also contemplated.

As shown in FIG. 3, each of the data frames 72 sent on the forward channel is composed of a synchronization portion (115 ms in duration), and 11 data blocks (each 160 ms in duration). The data blocks contain the forward channel data separated into block information, address, vector and message data fields. The reverse channel used for inbound messaging to the system controller is time synchronized with the forward channel and is composed of transmission time-slots (each approximately 16.04 ms in duration at 9600 bps). A single frame time of 1.875 seconds contains some number of transmission time-slots in the range of 1–116. The number of time-slots per a frame depends on whether the system 10 is operating in a time division duplex (TDD) mode or a frequency division duplex (FDD) mode. A portion of the reverse channel slot range is designated as the scheduled transmission portion and the remaining portion of the transmission time-slots is designated as the unscheduled or slotted ALOHA portion. Preferably, the system 10 operates in the frequency division duplex mode and transmissions from utility meter devices 22 occur within the scheduled transmission portion. Also shown in FIG. 3, is an exploded pictorial view of the contents of a representative time-slot which, in this example, is a data unit 83 having one packet of information. A reverse channel transmission from the utility meter transmitter 46 is in the form of a data unit. A data unit is a parcel of scheduled transmitted data that is recognized by the system 10. The data unit is composed up of some integer number of packets. This number is variable, but for obtaining meter readings via a reverse channel, the number of packets is preferably one. Each data unit is pre-assigned an ID number that is not used to identify a particular utility meter device 22, but rather, used to identify a type of data unit 83. A data unit in accordance with the invention is not preceded by a start address unit as is the case with a data unit from a pager. The ID number of a data unit in accordance with the invention is an arbitrary four bit binary number which is identical for all data units 83 transmitted from meter reading devices 22. Provision is made for this four bit ID number in order to maintain compatibility with the ReFLEX protocol. Alternatively, no ID number is transmitted. Bits 5–52 contain 48 bits of meter reading information. Bits 53–104 contain bits for parity use and 12 bits for a cyclic redundancy check (CRC). Advantageously, no information identifying a particular meter reading device 22 appears within the data unit 83 or is otherwise is transmitted by the transmitter 46 of the meter reading device 22.

Figure 4:
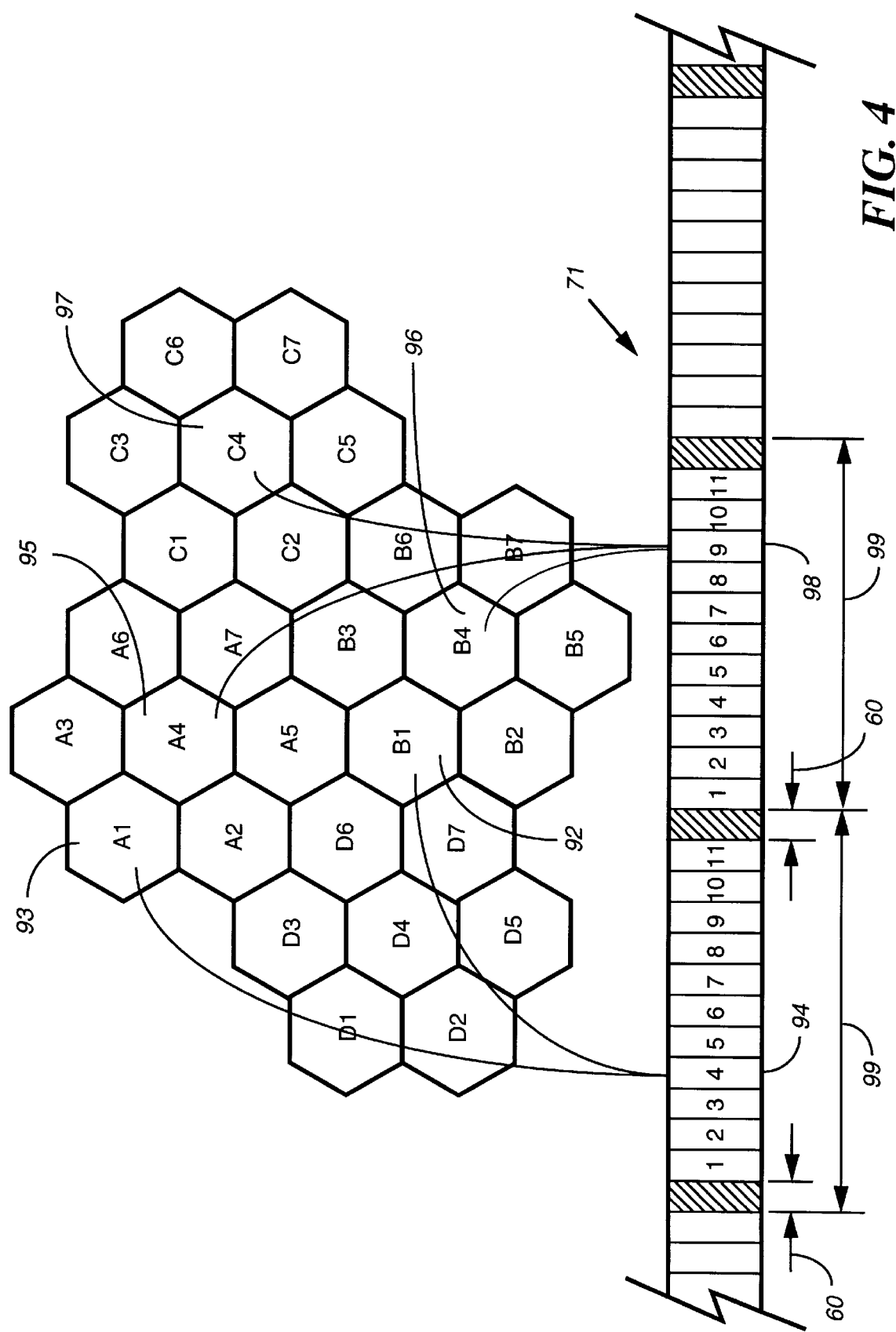
FIG. 4 is a simplified pictorial representation showing a correspondence between cells of the communication system of FIG. 1 and time-slots in the reverse channel timing diagram of FIG. 3.

Referring now to FIG. 4, there is shown the geographical relationship between a first cell 92 and a second cell 93 spaced apart sufficiently to allow a transmission by a utility meter device 22 in the first cell 92 during a same time-slot 94 as a transmission from a utility meter device in the second cell 93. In a similar manner, a utility meter devices 22 within cells 95, 96 and 97 are capable of transmitting a signal during a same time-slot 98 and each utility meter device 22 is distinguishable by which receiver 16 receives each signal. The portion of the reverse channel 71 radio signal timing diagram depicted in FIG. 4 shows eleven reverse channel time-slots, for example, time-slots 94 and 98, per reverse channel frame 99. This is equivalent to a reverse channel data rate of 800 bps. Alternatively, FIG. 3 shows 121 reverse channel time-slots, for example, slots 90 and 91, per reverse channel frame. This is equivalent to a reverse channel data rate of 9600 bps.

In summary, the specification has described a method of identifying utility meter transmitters 46 that are sources of hertzian wave, or radio frequency transmissions, and in which a utility meter 30 is connected to each of the transmitters 46. Each one of the plurality of hertzian wave transmissions carries a signal representative of a reading of one of the utility meters 30 and each transmission is at a same radio frequency and has a predetermined maximum duration such that the entire transmission temporally fits within a reverse channel synchronous paging protocol time-slot. The method comprises the steps of: pre-programming each transmitter to make a transmission at different times, each transmission spaced apart in time a period equal to or greater than the predetermined maximum duration such that no two transmissions occur during the same time-slot 90; receiving at a system receiver 16 each transmission from the transmitters 46; and correlating each transmission with each transmitter based upon time of reception, where none of the transmissions contain information identifying a source of any of the transmissions. An additional system receiver 17, geographically spaced from the system receiver 16, can also be included, in which there can be the additional step of an additional transmitter (not shown, but substantially similar to transmitter 46) at an additional utility meter device 23 transmitting at a same time as a one transmitter 46, wherein the additional system receiver 17 receives a transmission from the additional transmitter at the same time as the system receiver 16 is receiving a transmission from the one transmitter 46.

The specification has also described a radio communication system 10 having at least one system receiver 16, and a plurality utility meters 30 each connected to a utility meter transmitter 46. The radio communication system uses a synchronous, time-division multiplex protocol that has a cycle divided into a plurality of time-slots 90. Each utility meter transmitter 46 carries a signal representative of a reading of its connected utility meter 30. The specification has described a method of remotely reading utility meters 30, comprising the steps of: obtaining a first reading from a utility meter; obtaining a second reading from another utility meter; pre-programming one utility meter transmitter to transmit a signal containing the first reading during a pre-selected one of the time-slots 90; pre-programming another utility meter transmitter to transmit a signal containing the second reading during a pre-selected another time-slot 91; receiving, at the at least one system receiver, a received signal from one of either the one utility meter transmitter or the other utility meter transmitter; and correlating the received signal with the one utility meter that was the source of the transmission based upon a time of reception of the received signal. The radio communication system can also include a meter reading correlator 24 having a memory, and in which case the step of correlating can include the sub-steps of: storing in the memory a list of pre-selected time-slots and a table of connected utility meters; and comparing the time of reception of the received signal with the list.

The specification has also described a meter reading device 22 that wirelessly transmits meter readings from a meter, such as a utility meter 30, which includes a receiver 44 for receiving a synchronization signal 60; a clock 40 pre-settable to real time connected to the receiver, and in which the clock is re-settable by the synchronization signal 60; a wireless transmitter 46 connected to the receiver 44 for transmitting meter readings in synchronization with the synchronization signal; and a computer 32 pre-programmable to receive meter readings from the meter and to actuate the wireless transmitter at a specific time, and in which the computer is connected to the clock, to the wireless transmitter and to the meter, and in which the computer includes a memory for storing readings from the meter. The accuracy of the real time clock 40 will drift with the passage of time, and the meter reading device in accordance with the invention has provision for the real time clock to be re-set. It has also been described that the wireless transmitter can transmit on a reverse channel of a two-way paging system in compliance with a synchronous two-way paging communication protocol. It has further been described that the receiver can be a wireless receiver for wirelessly receiving the synchronization signal, and, in which case, the synchronization signal is transmitted by a fixed transmitter of a one-way paging system or by a fixed transmitter 54 of the two-way paging system on a forward channel of the two-way paging system.

While a detailed description of the preferred embodiment has been given, it should be appreciated that many variations can be made thereto without departing from the scope of the invention as set forth in the claims. For example, the invention is not limited to obtaining readings from utility meters, but can obtain readings from any type of meter, or from any type of device whatsoever, such as a vending machine.

We claim:

1. In a radio communication system having at least one system receiver, a plurality of utility meter transmitters and a plurality of utility meters, each utility meter connected to one of the plurality of utility meter transmitters, the radio communication system using a synchronous, time-division multiplex protocol, the synchronous, time-division multiplex protocol having a cycle divided into a plurality of time-slots, a hertzian wave transmission from each utility meter transmitter carrying a signal representative of a ready of a connected utility meter, a method of remotely reading utility meters, comprising the steps of:

obtaining a first reading from an associated utility meter;

obtaining a section reading form another associated utility meter;

pre-programming one utility meter transmitter of the plurality of utility meter transmitters to transmit a signal containing the first reading during a pre-selected one of the plurality of time-slots;

pre-programming another utility meter transmitter of the plurality of utility meter transmitters to transmit a signal containing the second reading during another preselected one of the plurality of time-slots;

receiving at the at least one system receiver a received signal from one of
      the one utility meter transmitter of the plurality of utility meter transmitters, and
      said another utility meter transmitter of the plurality of utility meter transmitters; and correlating the received signal with one utility meter of the plurality utility meters based upon a time of reception of the received signal.

2. The radio communication system of claim 1 including a meter reading correlator having a memory, and in which the step of correlating further comprises the steps of:

storing in the memory a list of pre-selected time-slots and a table of connected utility meters; and comparing the time of reception of the received signal with the list.

3. The method of claim 2, including a clock coupled to each utility meter transmitter of the plurality of utility meter transmitters and to the at least one system receiver, and wherein transmitting and receiving are performed synchronously.

4. The method of claim 3 in which transmitting and receiving are compliant with a two-way paging reverse channel protocol.

5. A method of correlating utility meter readings transmitted from a utility meter on a reverse channel of a synchronous two-way paging system and received by a paging system receiver, comprising the steps of:

at the utility meter, synchronously transmitting a wireless signal on the reverse channel, the wireless signal composed solely of a reading of the utility meter;

at the paging system receiver, synchronously receiving the wireless signal; and correlating the wireless signal with a utility meter based solely upon time of reception of the wireless signal.

\* \* \* \* \*